United States Patent
Rozo et al.

(10) Patent No.: US 11,648,664 B2
(45) Date of Patent: May 16, 2023

(54) METHOD FOR CONTROLLING A ROBOT AND ROBOT CONTROLLER

(71) Applicant: Robert Bosch GmbH, Stuttgart (DE)

(72) Inventors: Leonel Rozo, Boeblingen (DE); Noemie Jaquier, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 312 days.

(21) Appl. No.: 17/074,137

(22) Filed: Oct. 19, 2020

(65) Prior Publication Data
US 2021/0122037 A1    Apr. 29, 2021

(30) Foreign Application Priority Data

Oct. 25, 2019   (EP) .................................... 19205385

(51) Int. Cl.
*B25J 9/16*       (2006.01)
*G05B 19/4155*    (2006.01)

(52) U.S. Cl.
CPC ............ *B25J 9/163* (2013.01); *B25J 9/1664* (2013.01); *G05B 19/4155* (2013.01); *G05B 2219/40269* (2013.01)

(58) Field of Classification Search
CPC ......... B25J 9/1664; B25J 9/163; G06N 3/006; G06N 20/10; G06N 7/005; G06N 5/003; G05B 19/4155; G05B 2219/40269
See application file for complete search history.

(56) References Cited

U.S. PATENT DOCUMENTS

| | | | |
|---|---|---|---|
| 2016/0187874 A1* | 6/2016 | Chen | G06Q 50/04 700/96 |
| 2020/0086480 A1* | 3/2020 | Haddadin | B25J 9/1633 |
| 2021/0178585 A1* | 6/2021 | Rozo | G06N 20/10 |

FOREIGN PATENT DOCUMENTS

WO    WO-2018219943 A1 * 12/2018 ............ B25J 9/0081

OTHER PUBLICATIONS

Zeestraten; "Learning Task-Space Synergies using Riemannian Geometry"; 2017 IEEE/RSJ International Conference on Intelligent Robots and Systems; 2017; pp. 73-78 (Year: 2017).*

(Continued)

*Primary Examiner* — Stephen Holwerda
(74) *Attorney, Agent, or Firm* — Norton Rose Fulbright US LLP; Gerard Messina

(57) ABSTRACT

A method for controlling a robot using control parameter values from a non-Euclidean control parameter space. The method includes performing a Bayesian optimization of an objective function representing a desired control objective of the robot over the control parameter space, wherein evaluation points of the objective function are determined by searching an optimum of an acquisition function in an iterative search. In each iteration, the following are performed: updating a candidate evaluation point using a search direction in the tangent space of the parameter space at the candidate evaluation point, mapping the updated candidate evaluation point from the tangent space to the parameter space, and using the mapped updated candidate evaluation point as evaluation point for a next iteration until a stop criterion is fulfilled, and controlling the robot in accordance with a control parameter value found in the Bayesian optimization.

12 Claims, 5 Drawing Sheets

(56) References Cited

OTHER PUBLICATIONS

Wang; "The Kinematic Analysis and Stiffness Optimization for an 8-DOF Cable-driven Manipulator"; 2017 IEEE 8th International Conference on CIS & RAM; pp. 682-687; 2017 (Year: 2017).*

Agarwalla, ert al.: "Bayesian Optimisation with Prior Reuse for Motion Planning in Robot Soccer", Data Science and Management of Data, (CoDS-COMAD), Jan. 11-13, 2018, Goa, India, pp. 1-10, XP058386106.

Jaquier, et al.: "Bayesian Optimization Meets Riemannian Manifolds in Robot Learning", 3rd Conference on Robot Learning, (CoRL 2019), Osaka, Japan, pp. 1-14, XP055686156.

Bobak Shahriari et al. "Taking the humans out of the loop: A review of Bayesian optimization," in proceeding of the IEEE, 104(1): 148-175, 2016. Retrieved from the Internet on Oct. 19, 2020: https://ieeexplore.ieee.org/document/7352306. 28 Pages.

* cited by examiner

METHOD FOR CONTROLLING A ROBOT AND ROBOT CONTROLLER

CROSS REFERENCE

The present application claims the benefit under 35 U.S.C. § 119 of European Patent Application No. EP 19205385.8 filed on Oct. 25, 2019, which is expressly incorporated herein by reference in its entirety.

FIELD

The present invention relates to methods for controlling a robot and robot controllers.

BACKGROUND INFORMATION

Bayesian optimization (BO) recently became popular in robotics to optimize control parameters and parametric policies in direct reinforcement learning due to its data efficiency and gradient-free approach.

The paper by B. Shahriari et al. "Taking the humans out of the loop: A review of Bayesian optimization", in Proceedings of the IEEE, 104(1): 148-175, 2016, gives an introduction to Bayesian optimization, highlights some of its methodological aspects, and showcases a wide range of applications.

However, performance of Bayesian optimization for optimizing robot control parameters may be seriously compromised when the parameter space is high-dimensional. Further, it should be noted that parameter spaces in robot control may be non-Euclidean. For example, stiffness may be represented by a positive definite matrix (i.e., the parameter space forms a manifold of symmetric positive definite matrices) and vectors on a unit sphere may be used to represent orientations.

In view of the above, efficient approaches for performing Bayesian optimization for non-Euclidean parameter spaces are desirable.

According to various embodiments of the present invention, a method for controlling a robot using control parameter values from a non-Euclidean control parameter space is provided comprising performing a Bayesian optimization of an objective function representing a desired control objective of the robot over the control parameter space, wherein evaluation points of the objective function are determined by searching an optimum of an acquisition function in an iterative search, comprising, in each iteration, updating a candidate evaluation point using a search direction in the tangent space of the parameter space at the candidate evaluation point; mapping the updated candidate evaluation point from the tangent space to the parameter space; and using the mapped updated candidate evaluation point as evaluation point for a next iteration until a stop criterion is fulfilled and controlling the robot in accordance with a control parameter value found in the Bayesian optimization. This method provides a first example.

According to another embodiment of the present invention, a robot controller is provided configured to perform the method described above.

The robot control method and the robot controller as above allow bringing geometry-awareness into Bayesian optimization, thus improving its performance and scalability, in particular providing faster convergence, better accuracy and lower solution variance when compared to geometry unaware Bayesian optimization implementations. Experiments show that these effects increase as the manifold dimensionality increases.

The robot control method and robot controller therefore provide an efficient approach for robot skill learning or adaptation to unseen conditions by modifying the parameters of the considered system when these display non-Euclidean geometries. By introducing domain knowledge into the Bayesian optimization framework and exploiting the geometry of non-Euclidean parameter spaces, which arise in robotics (e.g., orientation, stiffness matrix), the Bayesian optimization may properly measure similarities in the parameter space through geometry-aware kernel functions and to optimize the acquisition function on the manifold as an unconstrained problem.

In the following, additional Examples are given.

Example 2 is the method according to Example 1 (i.e., the first example as described above), comprising determining the search direction according to the conjugate gradient method.

By using conjugate gradient for optimization, fast convergence can be achieved.

Example 3 is the method according to Example 2, comprising determining a search direction for the mapped updated candidate evaluation point by modifying the gradient of the acquisition function at the mapped updated candidate evaluation point by a multiple of the search direction at the candidate evaluation point mapped to the tangent space of the parameter space at the mapped updated candidate evaluation point by parallel transport.

Example 4 is the method according to any one of Examples 1 to 3, comprising mapping the updated candidate evaluation point from the tangent space to the parameter space using the exponential map of the tangent space at the candidate evaluation point.

Examples 3 and 4 allow the efficient application of the conjugate gradient method to a control parameter space forming a manifold.

Example 5 is the method according to any one of Examples 1 to 4, wherein the parameter space is a Riemannian manifold and wherein the Bayesian optimization uses a Gaussian process as surrogate model having a kernel dependent on the induced metric of the Riemannian manifold.

In other words, a geometry-aware kernel is used which allows a proper measure of similarity of control parameters.

Example 6 is the method according to Example 5, further comprising setting a parameter of the kernel to make the kernel positive definite.

This allows a valid application of a Gaussian surrogate model to a non-Euclidean control parameter manifold.

Example 7 is the method according to Example 5 or 6, comprising calculating kernel matrices for multiple randomly sampled pairs of points of the parameter space and setting a parameter of the kernel to the minimum value for which the kernel matrices are positive definite.

By this procedure, a kernel parameter can be efficiently found ensuring that the kernel of the Gaussian surrogate model is positive definite.

Example 8 is the method according to Example 1, wherein updating the candidate evaluation point comprises a line search along the search direction.

Applying a line search for updating the candidate evaluation point allows achieving a quick convergence to an optimum.

Example 9 is the method according to any one of Examples 1 to 8, wherein the parameter space is a sphere or a manifold of symmetric positive definite matrices.

These parameter spaces are especially useful for robot control.

Example 10 is the method according to any one of Examples 1 to 9, wherein the objective function represents a desired position of a part of the robot.

Example 11 is the method according to any one of Examples 1 to 10, wherein the parameter values represent stiffness, inertia, manipulability, orientation or pose.

Example 12 is a robot controller configured to perform the method of any one of Examples 1 to 11.

Example 13 is a computer program comprising instructions which, when executed by a processor, makes the processor perform a method according to any one of Examples 1 to 11.

Example 14 is a computer readable medium storing instructions which, when executed by a processor, makes the processor perform a method according to any one of Examples 1 to 11.

In the figures, like reference characters generally refer to the same parts throughout the different views. The figures are not necessarily to scale, emphasis instead generally being placed upon illustrating the main features of the present invention. In the description below, various aspects of the present invention are described with reference to the figures.

DETAILED DESCRIPTION OF EXAMPLE EMBODIMENTS

The detailed description below refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
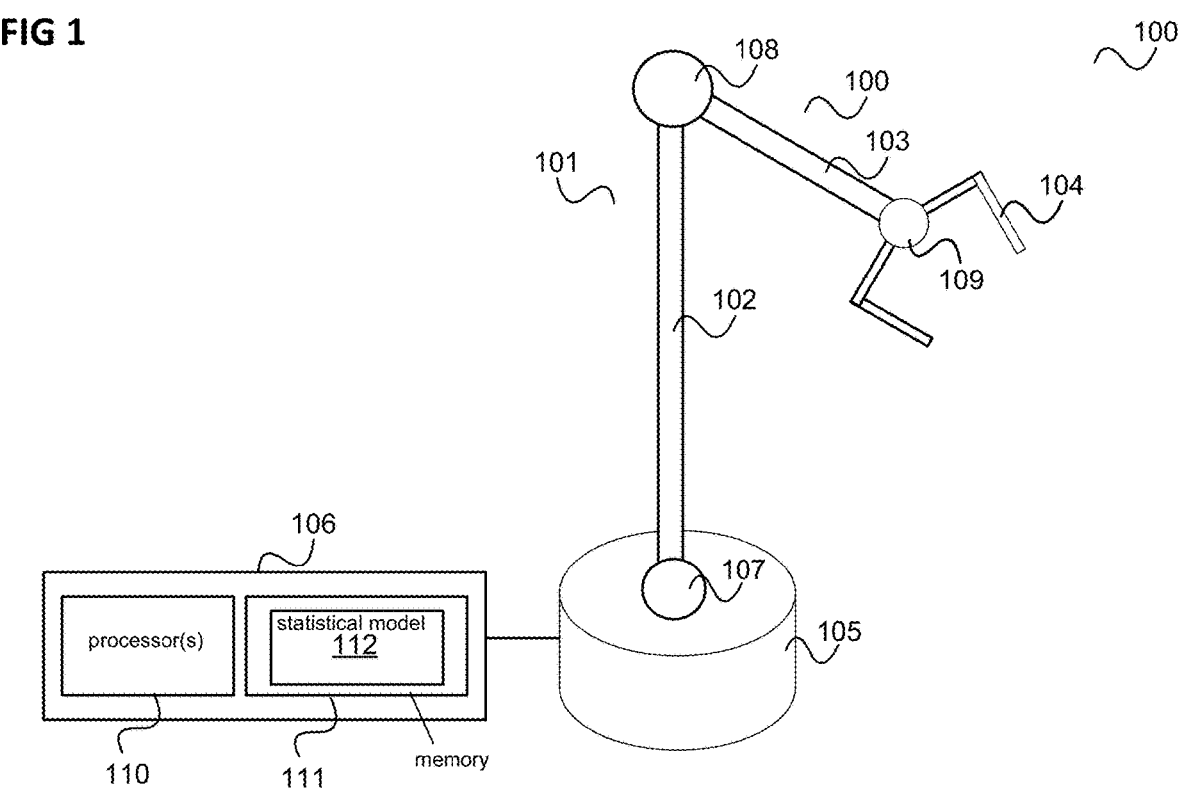
FIG. 1 shows a robot device arrangement.

FIG. 1 shows a robot device arrangement 100.

The robot device arrangement 100 includes a robot device 101, for example an industrial robot for handling, assembling or machining a workpiece. The robot device 101 includes manipulators 102, 103, 104 and a base (or support) 105 by which the manipulators 102, 103, 104 are supported. The term "manipulator" refers to the movable members of the robot device 101, the actuation of which enables physical interaction with the environment, e.g., to carry out a task. For control, the robot device arrangement 100 includes a controller 106 configured to implement the interaction with the environment according to a control program. The last member 104 (when viewed from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, a robotic arm (more commonly referred to as an articulated arm) with the end-effector 104 at its end is provided. The robotic arm is a mechanical arm that can provide similar functions as a human arm (possibly with a tool at its end).

The robot device 101 may include joint elements 107, 108, 109 interconnecting the manipulators 102, 103, 104 with each other and with the support 105. A joint element 107, 108, 109 may have one or more joints, each of which may provide rotatable motion (i.e., rotational motion) and/or translatory motion (i.e., displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g., an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g., to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot device 101. According to various embodiments of the present invention, the controller 106 controls the robot device 101 on the basis of a statistical model 112 stored in the memory 111.

A robot such as implemented by robot device arrangement 100 can take advantage of learning-from-demonstration approaches to learn to execute a task or collaborate with a human partner. Human demonstrations can be encoded by a probabilistic model (also referred to as statistical model) that represents the nominal plan of the task for the robot. The controller 106 can subsequently use the statistical model to generate the desired robot movements, possibly as a function of the state of both the human partner and the environment.

When a robot (i.e., a robot device 101 together with its controller 106) learns new skills or should adapt its behaviour to unseen conditions, its learning process should be safe, fast and data-efficient as the robot is a physical system interacting with the environment, making every single interaction costly. In reinforcement learning (RL) for robotics, such as it is applied according to various embodiments, Bayesian Optimization (BO) has gained increasing interest due to its success on optimizing parametric policies in several challenging scenarios. Its popularity is due to its ability to model complex noisy cost functions in a data-efficient manner, contrasting to data-hungry methods used in deep RL. However, Bayesian optimization performance degrades as the search space dimensionality increases, opening the door to different approaches dealing with the curse of dimensionality. Its performance also depends on the generalization capabilities of Gaussian process (GP) models (the typical surrogate model of BO), which is strongly impacted by the definition of both the mean and kernel functions.

Bayesian optimization may be widely used in diverse robotic applications, such as behaviour adaptation for damaged legged robots, controller tuning for balancing, biped locomotion, whole body control, physical human-robot interaction, and manipulation. In an embodiment like the one illustrated in FIG. 1 with a robotic arm, Bayesian optimization may for example be used to adapt the robot control in case of failure of one of the joints. However, embodiments of the present invention are not limited to robotic arms but may also be applied to other forms of robots and applications such as those mentioned before including in particular finding optimal orientations for regulation tasks, finding an optimal stiffness matrix of an impedance control policy, which is of interest for variable impedance learning approaches.

A key aspect of the success of Bayesian optimization can be seen in the use of domain knowledge, mainly introduced into the surrogate model or the acquisition function. This prior information decreases the problem complexity and improves the convergence and accuracy of Bayesian optimization. According to various embodiments of the present invention, knowledge about the geometry of the parameter space is introduced into Bayesian optimization.

Bayesian optimization (BO) is a sequential search algorithm aiming at finding a global maximizer (or minimizer) of an unknown objective function $f$, i.e., finding $$x^* = \underset{x \in \mathcal{X}}{\mathrm{argmax}} f(x)$$

where $\chi \subseteq \mathbb{R}^{D_\chi}$ is some design space of interest (i.e., the parameter space from which parameter values may be chosen), with $D_\chi$ being the dimensionality of the parameter space. The black-box function $f$ has no simple closed form, but can be observed point-wise by evaluating its value at any arbitrary query point x in the domain. This evaluation produces noise104 corrupted (stochastic) outputs $y \in \mathbb{R}$ such that $\mathbb{E}[y|f(x)]=f(x)$, with observation noise $\sigma$.

In this setting, Bayesian optimization specifies a prior belief over the possible objective functions. Then, at each iteration n, this model is refined according to observed data $\mathcal{D}_n=\{(x_i,y_i)\}_{i=1}^n$ via Bayesian posterior update. An acquisition function $\gamma_n: \chi \mapsto \mathbb{R}$ is constructed to guide the search for the optimum.

This function evaluates the utility of candidate points for the next evaluation of f; therefore, the next query point $x_{n+1}$, is selected by maximizing $\gamma_n$, i.e., $x_{n+1}=\mathrm{argmax}_x \gamma_n(x; \mathcal{D}_n)$.

After N queries, the result is a final recommendation $x_N$, which represents the best estimate of the optimizer (for an iteration limit of N).

According to various embodiments, as it is typically done, the prior and posterior of $f$ are modelled using a Gaussian Process $\mathcal{GP}(\mu, k)$ with mean function $\mu: \chi \mapsto \mathbb{R}$ and positive-definite kernel (or covariance function) k: $\chi \times \chi \mapsto \mathbb{R}$.

Therefore, the function $f$ follows a Gaussian prior $f(x) \sim \mathcal{N}(\mu, K)$ where $\mu_i=\mu(x_i)$ and $\kappa$ is the covariance matrix with $\kappa=k(x_i,x_j)$.

With $\tilde{x}$ representing an arbitrary test point, the random variable $f(\tilde{x})$ conditioned on observations is also normally distributed with the following posterior mean and variance functions:

$$\mu_n(\tilde{x})=\mu(\tilde{x})+k(\tilde{x})^T(K+\sigma^2 I)^{-1}(y-\mu)$$

and $$\sigma_n^2(\tilde{x})=k(\tilde{x},\tilde{x})-k(\tilde{x})^T(K+\sigma^2 I)^{-1}k(\tilde{x})$$

where $k(\tilde{x})$ is a vector of covariance terms between $\tilde{x}$ and the observations $x_i$. The posterior mean and variance evaluated at any point $\tilde{x}$ respectively represent the model prediction and uncertainty of the objective function at $\tilde{x}$. In Bayesian optimization, these functions are exploited to select the next query $x_{n+1}$ by means of the acquisition function. The mean and kernel functions completely specify the GP and thus the model of the function $f$. The most common choice for the mean function is a constant value, while the kernel typically has the property that close points in the input space have stronger correlation than distant points. One popular kernel is the squared-exponential (SE) kernel $k(x_i,x_j)=\theta \exp(-\beta d(x_i,x_j)^2)$, where $d(.,.)$ denotes the distance between two observations and the parameters $\beta$ and $\theta$ control the horizontal and vertical scale of the function. The kernel parameters and the observation noise may be inferred via maximum likelihood estimation (MLE).

The acquisition function balances exploitation (e.g., selecting the point with the highest posterior mean) and exploration (e.g., selecting the point with the highest posterior variance) using the information given by the posterior functions. According to various embodiments of the present invention, an improvement-based acquisition function is used, namely expected improvement (EI).

For EI, the next query intuitively corresponds to the point where the expected improvement over the previous best observation $f_n^*$ is maximal.

According to various embodiments of the present invention, domain knowledge is included into the acquisition function by exploiting geometry-aware optimization that handle parameters lying on Riemannian manifolds.

Geometry-awareness is particularly relevant when the parameter space is not Euclidean, which is common in robotic applications, where a variety of manifolds arise. For example, forces and torques belong to the Euclidean manifold RD, stiffness, inertia and manipulability lie in the manifold of symmetric positive definite matrices S++, the special orthogonal group SO(3) or the unit-sphere $S^3$ are used to represent orientations, and the special Euclidean group SE(3) describes robot poses.

To introduce geometry-awareness into Bayesian optimization, according to various embodiments, knowledge from Riemannian manifold theory can be seen to be brought to Bayesian optimization. More specifically, according to various embodiments of the present invention, geometry-aware kernels allowing GP to properly measure the similarity between parameters lying on a Riemannian manifold are used, e.g., by the controller 106. In addition, the controller 106 uses Riemannian manifold tools to consider the geometry of the search space when optimizing the acquisition function, e.g., when adapting to a new scenario (including unseen conditions, e.g., in case of joint failure). These two features provide a fully geometry-aware Bayesian optimization framework which naturally handles the constraints of parameters lying on smooth differentiable manifolds.

In robotics, diverse type of data do not belong to a vector space and thus the use of classical Euclidean space methods for treating and analysing these variables is inadequate. An example is the unit quaternion, which may be used by the controller 106 to represent orientations, e.g., the orientation of the end-effector 104. The unit quaternion has unit norm and therefore can be represented as a point on the surface of a 3-sphere. Symmetric positive definite (SPD) matrices may also be used by the controller, e.g., in the form of stiffness and inertia matrices, or manipulability ellipsoids. Both the sphere and the space of SPD matrices can be endowed with a Riemannian metric to form Riemannian manifolds.

Intuitively, a Riemannian manifold $\mathcal{M}$ is a space for which each point locally resembles an Euclidean space. For each point $x \in \mathcal{M}$, there exists a tangent space $\mathcal{T}_x\mathcal{M}$ equipped with a smoothly-varying positive definite inner product called a Riemannian metric. This metric permits to define curve length on the manifold. Curves representing shortest paths on the Riemannian manifold are called geodesics and are the generalization of straight lines on the Euclidean space to Riemannian manifolds, as they represent the minimum length curves between two points in $\mathcal{M}$.

Figure 2:
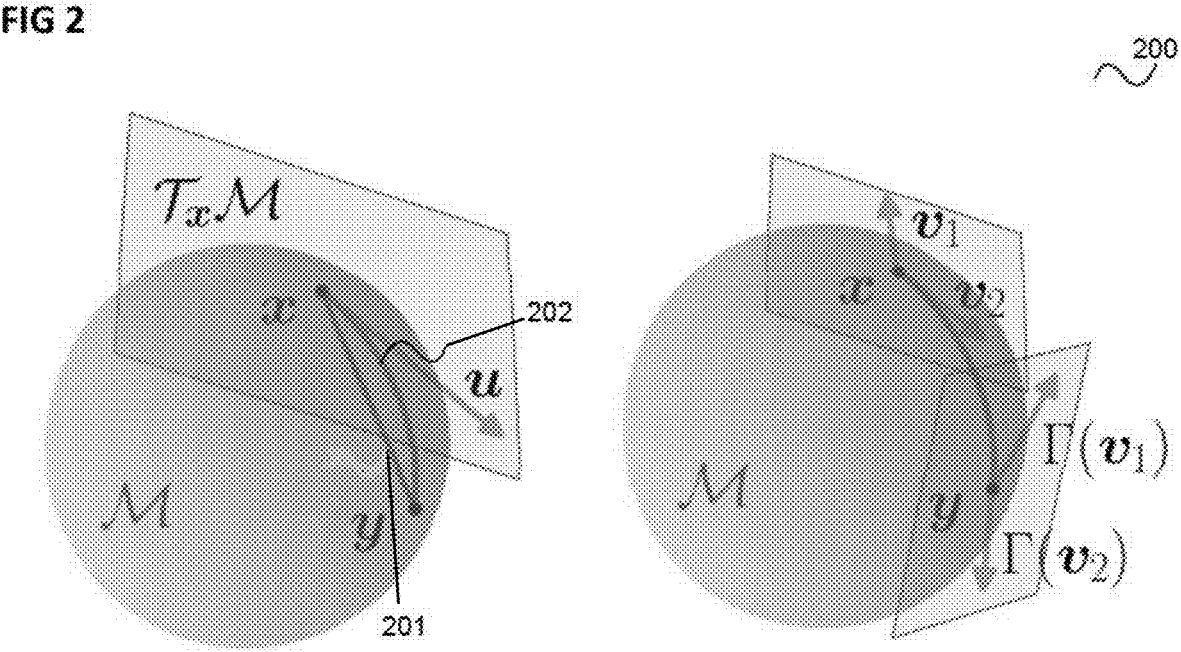
FIG. 2 shows an illustration of a sphere manifold $S^2$ whose points may for example each represent a possible orientation of a robot end-effector.

FIG. 2 shows an illustration of a sphere manifold $S^2$ whose points may for example each represent a possible orientation of a robot end-effector.

Two points x and y are indicated on the sphere which may be used by the controller 106 to represent two different orientations of the robot end-effector 104.

The shortest distance between the two points in the surrounding space would be a straight line 201 while the shortest path on the manifold is a geodesic 202.

Figure 3:
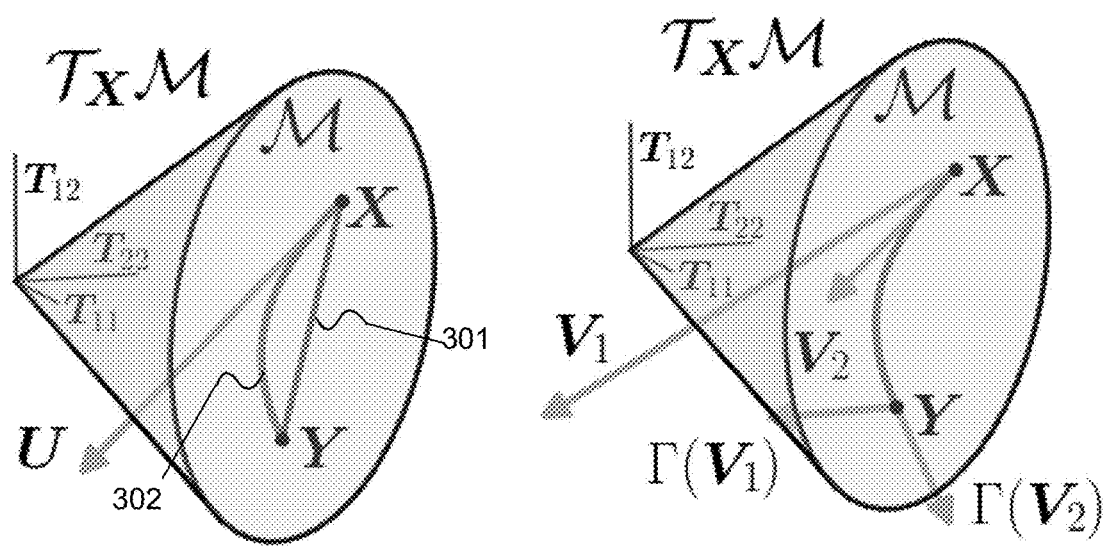
FIG. 3 shows an illustration of a SPD manifold $S_{++}^2$ whose points may for example each represent a stiffness ellipsoid.

FIG. 3 shows an illustration of a SPD manifold $\mathcal{S}_{++}^2$ (having the shape of a cone) whose points may for example each represent a stiffness ellipsoid.

Two points X and Y are indicated on the SPD manifold which may be used by the controller 106 to represent two different stiffness ellipsoids of the robot end-effector 104. Each point corresponds to a matrix $$\begin{pmatrix} T_{11} & T_{12} \\ T_{12} & T_{22} \end{pmatrix}$$

in the space $Sym^2$ in which the manifold $\mathcal{S}_{++}^2$ is embedded.

Again, the shortest distance between the two points in the surrounding space would be a straight line 301 while the shortest path on the manifold is a geodesic 302.

In FIGS. 2 and 3, the shortest Euclidean path 201, 301 differs from the geodesic 202, 302.

To utilize the Euclidean tangent spaces, mappings back and forth between the tangent space $\mathcal{T}_x\mathcal{M}$ ($T_X\mathcal{M}$ in FIG. 3) may be used, which are denoted as the exponential map and the logarithmic map, respectively.

The exponential map $Exp_x: \mathcal{T}_x\mathcal{M} \to \mathcal{M}$ maps a point u in the tangent space of x to a point y on the manifold, so that it lies on the geodesic starting at x (X in FIG. 3) in the direction u (U in FIG. 3) such that the geodesic distance dM between x and y (Y in FIG. 3) is equal to norm of the distance between x and u. The inverse operation is called the logarithmic map $Log_x: \mathcal{M} \to \mathcal{T}_x\mathcal{M}$, i.e., $u = Log_x(y)$.

Another useful operation over manifolds is the parallel transport $\Gamma_{x \to y}: \mathcal{T}_x\mathcal{M} \to \mathcal{T}_y\mathcal{M}$ which moves elements between tangent spaces such that the inner product between two elements in the tangent space remains constant.

For example, in FIG. 2, $\Gamma(v_1)$, $\Gamma(v_2)$ are the parallel transported Vectors $v_1$ and $v_2$ from $\mathcal{T}_x\mathcal{M}$ to $\mathcal{T}_y\mathcal{M}$. Analogously in FIG. 3 for the vectors $v_1$ and $v_2$.

More generally, the unit sphere $\mathcal{S}^d$ is a d-dimensional manifold embedded in $\mathbb{R}^{d+1}$. The tangent space $\mathcal{T}_x\mathcal{S}^d$ is the hyperplane tangent to the sphere at the point x. The manifold of D×D SPD matrices $\mathcal{S}_{++}^D$ can be represented as the interior of a convex cone embedded in $Sym^D$. The operations described above and illustrated in FIGS. 2 and 3 for D=2 are given in table 1.

TABLE 1

| Manifold | $d_M(x, y)$ | $Exp_x(u)$ | $Log_x(y)$ |
|---|---|---|---|
| $S^d$ | $\arccos(x^T y)$ | $x \cos(\|u\|) + \bar{u}\sin(\|u\|)$ | $d(x, y) \frac{y - x^T y x}{\|y - x^T y x\|}$ |
| $S_{++}^D$ | $\left\|\log\left(X^{-\frac{1}{2}} Y X^{-\frac{1}{2}}\right)\right\|_F$ | $X^{\frac{1}{2}} \exp\left(X^{-\frac{1}{2}} U X^{-\frac{1}{2}}\right) X^{\frac{1}{2}}$ | $X^{\frac{1}{2}} \exp\left(X^{-\frac{1}{2}} Y X^{-\frac{1}{2}}\right) X^{\frac{1}{2}}$ |
| | Parallel transport $\Gamma_{x \to y}(v)$ | | |
| $S^d$ | $(-x \sin(\|u\|)\bar{u}^T + \bar{u}\cos(\|u\|)\bar{u}^T + (I - \bar{u}\bar{u}^T))v$ | | with $\bar{u} = \frac{u}{\|u\|}$ |
| $S_{++}^D$ | $A_{X \to Y} V A_{X \to Y}^T$ with $A_{X \to Y} = Y^{\frac{1}{2}} X^{-\frac{1}{2}}$ | | |

In the following, the geometry-aware Bayesian optimization (GaBO) framework which may for example be used by the controller 106 to naturally handle the case where the design space of parameters $\chi$ is a Riemannian manifold or a subspace of a Riemannian manifold, i.e., $\chi \subseteq \mathcal{M}$ is described.

For this, the controller 106 models the unknown objective function $f$ by means of a Gaussian process adapted to manifold-valued data. This is achieved by defining geometry-aware kernels measuring the similarity of the parameters on the manifold. Moreover, the controller 106 selects the next query point $x_{n+1}$ by optimizing the acquisition function on the manifold $\mathcal{M}$.

The choice of the kernel function can be seen to be crucial for the GP as it encodes the prior about the function $f$. As the parameter x belongs to a Riemannian manifold, this a priori knowledge is included in the choice of the kernel. A straightforward approach to adapt distance-based kernels to Riemannian manifolds is to replace the Euclidean distance d by the geodesic distance $d_\mathcal{M}$ in the definition of the kernel. Thus, the geodesic generalization of the SE kernel is given by $$k(x_i,x_j)=\theta \exp(-\beta d_\mathcal{M}(x_i,x_j)^2)$$

It can be shown that such a kernel is valid, i.e., positive definite (PD) for all the parameters values, only if the manifold is isometric to an Euclidean space. This implies that the geodesic SE kernel is not valid for curved manifolds such as $\mathcal{S}^d$ and $\mathcal{S}_{++}^D$. To address, this, according to various embodiments, a minimum length scale parameter $\beta_{min}$ is determined such that for $\beta > \beta_{min}$ the kernel is positive definite.

Intervals of length scales $\beta$ for which kernel matrices are positive definite for a manifold of interest may be determined experimentally. For example, in order to compute $\beta_{min}$, 500 points from 10 Gaussian distributions on the manifold are sampled with random mean and covariance matrix I. Then, the corresponding kernel matrix $K_{ij}=k(x_i,x_j)$ is computed for a range of $\beta$ values with $\theta=1$. This is for example repeated 10 times for each value of $\beta$ and the percentage of resulting PD geodesic kernel matrices K is computed. According to one embodiment, as the minimum eigenvalue function is monotone with respect to $\beta$ and $K_{\beta \to \infty} \to I$, $\beta_{min}$ set fix equal to the minimum value of $\beta$ for which 100% of the matrices K are PD.

Figure 4:
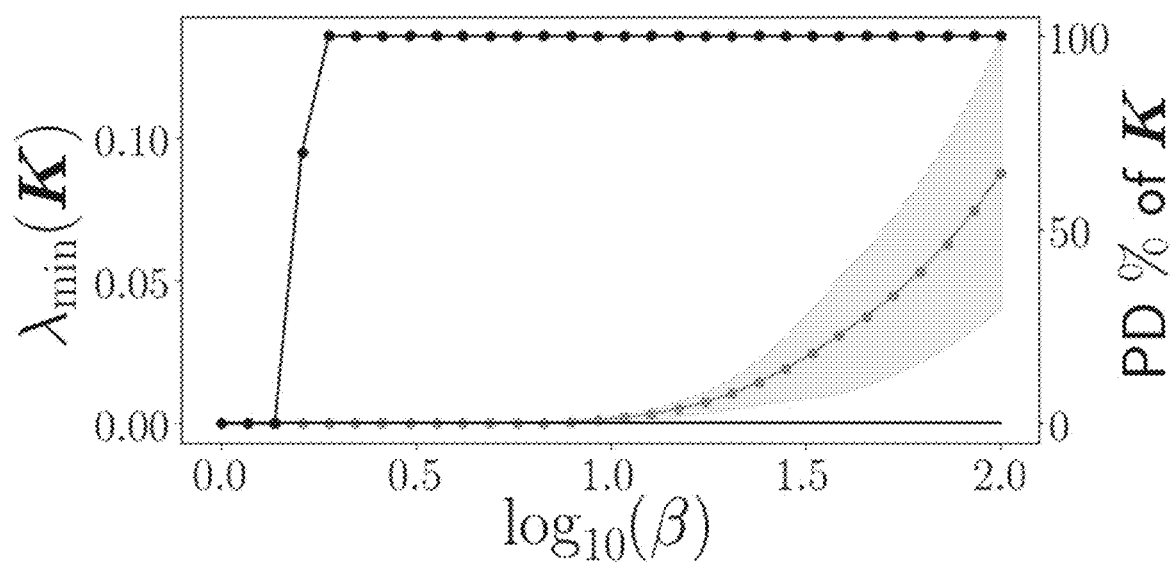
FIG. 4 shows diagrams showing the percentage of positive definite geodesic kernel matrices and the distribution of their minimum eigenvalue $\beta_{min}$ as a function of $\beta$ for $S^3$ and $S_{++}^3$, respectively.
Figure 4:
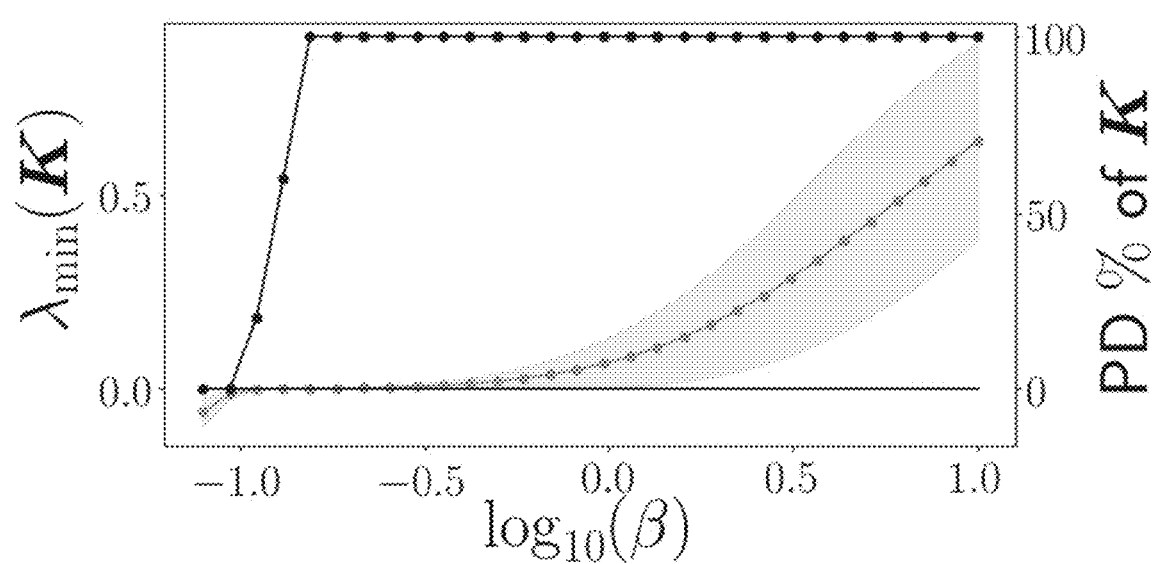

FIG. 4 shows diagrams 401, 402, showing the percentage of PD geodesic kernel matrices and the distribution of their minimum eigenvalue $\beta_{min}$ as a function of $\beta$ for $\mathcal{S}^3$ (diagram 401) and $\mathcal{S}_{++}^3$ (diagram 402).

Table 2 shows values of $\beta_{min}$ for various manifolds which may for example be used as parameter spaces by the controller 106.

TABLE 2

| $\mathcal{M}$ | $\mathcal{S}^2$ | $\mathcal{S}^3$ | $\mathcal{S}^4$ | $\mathcal{S}_{++}^2$ | $\mathcal{S}_{++}^3$ |
|---|---|---|---|---|---|
| $\beta_{min}$ | 6.5 | 2. | 1.2 | 0.6 | 0.2 |

It should be noted that other types of kernels for specific manifolds may also be used for Bayesian optimization. For example, the geodesic Laplacian kernel is valid on spheres and hyperbolic spaces. In particular, kernels specifically designed for a certain manifold (such as the Grassmannian) may be used.

When a robot controller (e.g., controller 106) performs Bayesian optimization, e.g., to adapt to a new scenario (e.g., to compensate for a joint failure in a robotic arm or a limb damage in a walking with multiple legs), the controller subsequently evaluates the unknown function $f$ to be optimized for certain $x_i$ from the parameter set, i.e., for certain robot control configurations. The unknown function $f$ may for example reflect how close to a desired position an object is placed or how close the robot moves with respect to a desired direction etc. In general, $f$ may be a cost function defining certain requirements which should be fulfilled. An example is a desired orientation, e.g., of the end-effector 104. This may be useful for tasks where the orientation reference of a controller needs to be refined to improve the task execution.

For example, a controller of a velocity-controlled robot samples an orientation reference $x \equiv \hat{q}_o$ around a prior orientation $\tilde{q}_o$, fixed by the user, with the aim of minimizing the cost function $f(q)=w_q\|\Delta(\tilde{q},q)\|^2+w_\tau\|\tau\|^2+w_m$, where $q_o$ is the current end-effector orientation, and cond(M) is the condition number of the linear velocity manipulability ellipsoid. This cost function aims at minimizing the error between the prior and the current end-effector orientation with low joint torques and an isotropic manipulability ellipsoid.

Another example is finding the optimal Cartesian stiffness of a torque-controlled robotic arm implementing a Cartesian control policy $f = K^\mathcal{P}(\hat{p}-p) - K^\mathcal{D}\dot{p}$, where p and $\dot{p}$ are the linear position and velocity of the robot end-effector, $K^\mathcal{P}$ and $K^\mathcal{D}$ are stiffness and damping matrices, f is the control force (transformed to desired torques via $\tau=J^Tf$). The robot task consists of tracking a desired Cartesian position $\hat{p}$ while a constant external force $f^e$ is applied to its end-effector. The policy parameter corresponds to the stiffness matrix, that is $x \equiv K^\mathcal{P}$. The stiffness-damping ratio is for example fixed as critically damped. Cost functions in this case may for example be $$f_1 K^\mathcal{P} = w_p\|\hat{p}-p\|^2 + w_d \det K^\mathcal{P} + w_c \text{cond } K^\mathcal{P}$$

and $$f_2 K^\mathcal{P} = w_p\|\hat{p}-p\|^2 + w_t\|\tau\|^2 \text{ for } K^\mathcal{P} \in \{\mathcal{S}_{++}^2, \mathcal{S}_{++}^3\}.$$

The cost function $f_1$ aims at accurately tracking the desired position using a low-volume isotropic stiffness matrix, while $f_2$ aims at tracking the desired position accurately with low torques. For $f_2$, a $-1$ reward may for example be added if the desired position is reached.

When the controller 106 has evaluated the function $f$, it can condition the Gaussian process modelling the function on the evaluations.

After refining the geometry-aware GP that models the unknown function $f$ in this manner, the controller 106 selects the next query point $x_{n+1}$ (i.e., the next point from the parameter space where the function $f$ is to be evaluated) by maximizing the acquisition function $\gamma_n$. According to various embodiments of the present invention, in order to take into account the geometry of the domain $\chi \subseteq \mathcal{M}$, the controller optimizes (i.e., searches for an optimum of) $\gamma_n$ using optimization techniques on manifolds.

It should be noted that thus, the acquisition function is not altered but its search space is modified (compared to optimizing over the whole parameter space). In this context, optimization algorithms on Riemannian manifolds constitute a powerful alternative to constrained optimization. These geometry-aware algorithms reformulate constrained problems as an unconstrained optimization on manifolds and consider the intrinsic structure of the space of interest. Also, they tend to show lower computational complexity and better numerical properties.

According to various embodiments, the controller 106 uses a conjugate gradient (CG) algorithm on Riemannian manifolds to maximize the acquisition function $\gamma_n$ (or to minimize $\phi_n = -\gamma_n$) at each iteration. An example is the following algorithm 1.

---
Algorithm 1: Optimization of acquisition function with CG on Riemannian manifolds
---

Input: Acquisition function $Y_n$, initial iterate $z_0 \in \mathcal{M}$
Output: Next parameter point $x_{n+1}$
1   Set $\phi_n = -\gamma_n$ as the function to minimize and $\eta_0 = -\nabla\phi_n(z_0)$ as search direction;
2   for k = 0, 1, . . . , K do
3       Compute the step size $\alpha_k$ using line search on Riemannian manifold

| Algorithm 1: Optimization of acquisition function with CG on Riemannian manifolds | |
|---|---|
| 4 | Set $z_{k+1} = \text{Exp}_{z_k}(\alpha_k \eta_k)$; |
| 5 | Compute $\beta_k^{HS} = \frac{\langle \nabla \phi_n(z_{k+1}), \nabla \phi_n(z_{k+1}) - \nabla \phi_n(z_k) \rangle_{z_k}}{\langle \eta_k, \nabla \phi_n(z_{k+1}) - \nabla \phi_n(z_k) \rangle_{z_k}}$ |
| 6 | Set $\eta_{k+1} = -\nabla \phi_n(z_{k+1}) + \beta_k^{HS} \Gamma_{z_k \to z_{k+1}}(\eta_k)$ |
| 7 | if convergence criterion is reached then |
| 8 | break |
| 9 | end |
| 10 | end |
| 11 | $x_{n+1} = z_{k+1}$ |

It should be noted that the line search on the Riemannian manifold in step 3 of the algorithm means that for each candidate α, the corresponding candidate point in the tangent space is mapped to the manifold via the exponential map and the acquisition function is evaluated for the point on the manifold.

The recursive process of algorithm 1 involves the same steps as Euclidean CG, namely: (i) a line minimization along the search direction (step 3 of algorithm 1); (ii) the iterate update along the search direction (step 4 of algorithm 1) and (iii) the computation of the next search direction combining the gradient of the function at the new iterate and the previous search direction (steps 5 and 6 of algorithm 1). The differences to the Euclidean version are:

- as the gradient $\nabla \phi(z_k)$ and thus the search direction $\eta_k$, belong to the tangent space of $z_k$, the exponential map is used to update the iterate along the search direction;
- (2) the step size is fixed by solving $\text{argmin}_{\alpha_k} \phi_n(\text{Exp}_{z_k}(\alpha_k \eta_k))$ with a line search on the manifold
- the previous search direction $\eta_k$ is parallel transported to the tangent space of $z_{k+1}$ to be combined with the gradient of the new iterate $-\nabla \phi_n(z_{k+1}) \in \mathcal{T}_{z_{k+1}} \mathcal{M}$ It should be noted that in this example, a CG (on manifold) with the Hastenes-Stiefel update parameter $\beta_k^{HS}$, but other update techniques can also be extended to Riemannian manifolds to be used according to various embodiments.

It should further be noted that for some problems, the controller 106 may bound the search domain to a subspace (of the parameter space manifold), for example, to cope with physical limits or safety constraints of a robot device 101 when optimizing end-effector orientations or impedance parameters. In such cases, and particularly when the manifold is not a closed space, the controller 106 may limit the search domain of the GaBO by defining boundary conditions inside the parameter manifold. This means that in that case, the controller optimizes the acquisition function over a true subset $\chi \subset \mathcal{M}$ of the parameter manifold $\mathcal{M}$.

For this, the controller 106 applies a bound constrained CG method extended to Riemannian manifolds to cope with boundary conditions in the optimization. For example, to do so, the steps 4-6 of algorithm 1 are updated as described in algorithm 2.

| Algorithm 2: Update of steps 4-6 of Algorithm 1 for a domain $\chi \subset \mathcal{M}$ | |
|---|---|
| 4 | Set $z_{k+1} = \text{Exp}_{z_k}(\alpha_k \eta_k)$ |
| | if $z_{k+1} \in \chi$ then |
| | Execute steps 5-6 of Algorithm 1 |

| Algorithm 2: Update of steps 4-6 of Algorithm 1 for a domain $\chi \subset \mathcal{M}$ | |
|---|---|
| 5 | else |
| | Project $z_{k+1}$ to $\chi$ |
| | Set $\eta_{k+1} = -\nabla \phi(z_{k+1})$ |
| | end |

At each iteration, if the updated iterate $z_{k+1} \notin \chi$ it is projected back onto the feasible domain and the search direction is reinitialized. For example, in $\mathcal{S}^d$ the design space (i.e., parameter space) is bounded by setting limits on the components of $x \in \mathcal{S}^d$. If a component is outside of the limits, it is fixed as equal to the closest limit and the remaining components are reformatted (e.g., scaled) so that x still belongs to the manifold. For $\mathcal{S}_{++}^D$, limits on the eigenvalues A of the SPD matrix may be defined. If an iterate $z_{k+1} \notin \chi$, it is projected back to the search domain by reducing/increasing the maximum/minimum eigenvalue of the iterate.

It should be noted that when the parameter space (i.e., the search domain) is limited to a subspace of the manifold, $\beta_{min}$ may be determined for that subspace. Thus, a lower value of $\beta_{min}$ may be achieved compared to determining $\beta_{min}$ for the whole parameter manifold. Since a high $\beta_{min}$ limits the spatial influence on the modelling of the function $f$, a lower $\beta_{min}$ may lead to quicker conversion.

Figure 5:
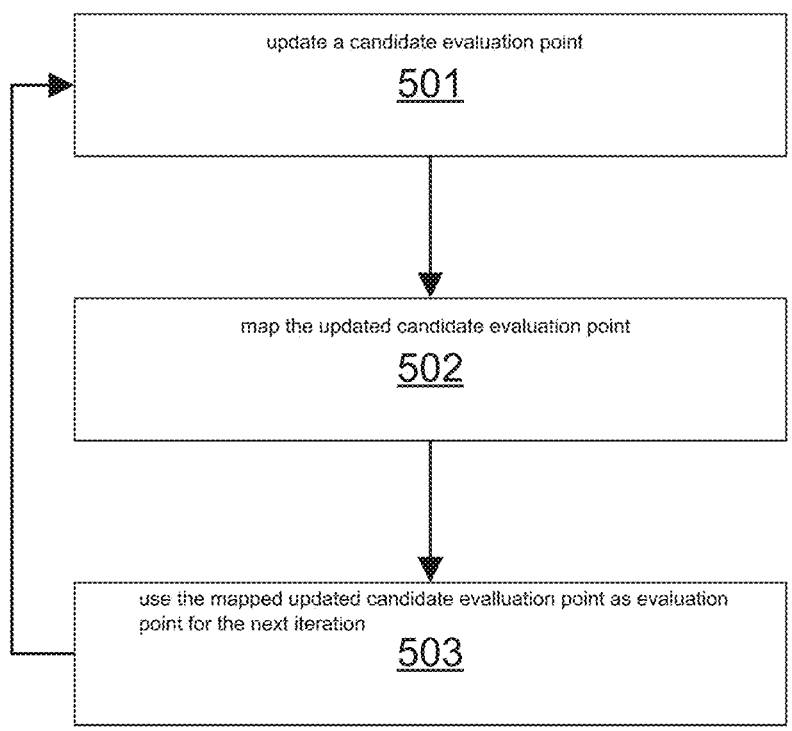
FIG. 5 shows a flow diagram illustrating a method for controlling a robot using control parameter values from a non-Euclidean control parameter space according to an embodiment of the present invention.

In summary, according to various embodiments of the present invention, a method is provided as illustrated in FIG. 5.

FIG. 5 shows a flow diagram 500 illustrating a method for controlling a robot (or robot device) using control parameter values from a non-Euclidean control parameter space according to an embodiment.

The example method includes performing a Bayesian optimization of an objective function representing a desired control objective of the robot over the control parameter space, wherein evaluation points of the objective function are determined by searching an optimum of an acquisition function in an iterative search, comprising, in each iteration:

In 501, updating a candidate evaluation point using a search direction in the tangent space of the parameter space at the candidate evaluation point.

In 502, mapping the updated candidate evaluation point from the tangent space to the parameter space.

In 503, using the mapped updated candidate evaluation point as evaluation point for a next iteration until a stop criterion is fulfilled.

The robot is then controlled in accordance with a control parameter value found in the Bayesian optimization.

According to various embodiments of the present invention, in other words, geometry information is included into the optimization of the acquisition function when performing Bayesian optimization, e.g., for optimizing the control parameters (or a parametric policy in direct reinforcement learning cases) to maximize/minimize an unknown objective function, wherein the parameters belong to a search space with a particular geometry (a Riemannian manifold).

Specifically, the update of a (current) estimate in the optimization of the acquisition function is made dependent on the tangent space at the current estimate. Furthermore, when the conjugate gradient method is used for searching an optimum of the acquisition function the search direction update is made dependent on the relation between the tangent spaces at the (previous) estimate and the updated estimate. Additionally, the kernel of the (e.g.) Gaussian process surrogate model of the Bayesian optimization may be geometry-dependent (or geometry-aware) such that the approach becomes fully geometry-aware as both the kernel function and the optimization of the acquisition function consider the geometry of the search space (i.e., the parameter space).

Thus, a geometry-aware Bayesian optimization (GaBO) framework is provided that exploits the geometry of the search space to properly seek optimal parameters that lie on Riemannian manifolds. To do so, a geometry-aware kernel is used that allows the GP to properly measure the similarity between parameters lying on a Riemannian manifold. Moreover, Riemannian manifold tools are exploited to consider the geometry of the search space when optimizing the acquisition function.

The objective function may be evaluated in course of the Bayesian optimization by means of sensor signals acquired by various types of sensors, including for example any type of force or torque sensor, e.g., attached at the robot end-effector, or by using joint torque sensors of the robot.

The method may be used to control the mechanical part of any type of robot device, e.g., a robot arm or in general a physical system (having a mechanical part whose movement is controlled), like a computer-controlled machine, a vehicle, a domestic appliance, a power tool, a manufacturing machine, a personal assistant or an access control system. Based on the approaches described herein a machine learning system may be trained and adapted and may be used for the above applications.

The method of FIG. 5 may be performed by one or more processors. The term "processor" can be understood as any type of entity that allows the processing of data or signals. For example, the data or signals may be treated according to at least one (i.e., one or more than one) specific function performed by the processor. A processor may include an analogue circuit, a digital circuit, a composite signal circuit, a logic circuit, a microprocessor, a central processing unit (CPU), a graphics processing unit (GPU), a digital signal processor (DSP), a programmable gate array (FPGA) integrated circuit or any combination thereof or be formed from it. Any other way of implementing the respective functions, which will be described in more detail below, may also be understood as processor or logic circuitry. It will be understood that one or more of the method steps described in detail herein may be executed (e.g., implemented) by a processor through one or more specific functions performed by the processor.

According to one embodiment, the method serves to optimize a manifold-valued parameter to maximize/minimize an unknown objective function. Initially, some few values of the parameters are tested and the corresponding value of the function measured. Then, the method comprises (1) Modelling the unknown objective function by means of a surrogate model. It for example corresponds to a Gaussian process adapted to manifold-valued data, trained on the observed points (i.e., parameters values with corresponding observed values of the unknown function).

(2) Maximizing an acquisition function constructed in function of the surrogate model on the manifold of the parameter. The parameters corresponding to the maximum of the acquisition function is the next query point.

(3) Measuring the value of the function for the computed next query point.

This procedure is iteratively repeated a determined number of iterations (N). After N iterations, the parameters corresponding to the best measured value of the function are selected.

Although specific embodiments have been illustrated and described herein, it will be appreciated by those of ordinary skill in the art that a variety of alternate and/or equivalent implementations may be substituted for the specific embodiments shown and described without departing from the scope of the present invention. This present invention is intended to cover any adaptations or variations of the specific embodiments discussed herein.

What is claimed is:

1. A computer-implemented method for controlling a robot using control parameter values from a non-Euclidean control parameter space the method comprising:
    performing a Bayesian optimization of an objective function representing a desired control objective of the robot over a control parameter space, wherein evaluation points of the objective function are determined by searching an optimum of an acquisition function in an iterative search, including, in each iteration:
        updating a candidate evaluation point using a search direction in a tangent space of the parameter space at the candidate evaluation point,
        mapping the updated candidate evaluation point from the tangent space to the parameter space, and
        using the mapped updated candidate evaluation point as candidate evaluation point for a next iteration until a stop criterion is fulfilled;
    controlling the robot in accordance with a control parameter value found in the Bayesian optimization;
    determining the search direction according to the conjugate gradient method; and
    determining a search direction for the mapped updated candidate evaluation point by modifying a gradient of the acquisition function at the mapped updated candidate evaluation point by a multiple of the search direction at the candidate evaluation point mapped to the tangent space of the parameter space at the mapped updated candidate evaluation point by parallel transport.

2. The method according to claim 1, wherein the mapping of the updated candidate evaluation point from the tangent space to the parameter space is performed using an exponential map of the tangent space at the candidate evaluation point.

3. The method according to claim 1, wherein the parameter space is a Riemannian manifold and wherein the Bayesian optimization uses a Gaussian process as surrogate model having a kernel dependent on an induced metric of the Riemannian manifold.

4. The method according to claim 3, further comprising: setting a parameter of the kernel to make the kernel positive definite.

5. The method according to claim 1, wherein the updating of the candidate evaluation point includes a line search along the search direction.

6. The method according to claim 1, wherein the parameter space is a sphere or a manifold of symmetric positive definite matrices.

7. The method according to claim 1, wherein the objective function represents a desired position of a part of the robot.

8. The method according to claim 1, wherein the parameter values represent stiffness or inertia or manipulability or orientation or pose.

9. A computer-implemented method for controlling a robot using control parameter values from a non-Euclidean control parameter space the method comprising:
    performing a Bayesian optimization of an objective function representing a desired control objective of the robot over a control parameter space, wherein evaluation points of the objective function are determined by searching an optimum of an acquisition function in an iterative search, including, in each iteration:
        updating a candidate evaluation point using a search direction in a tangent space of the parameter space at the candidate evaluation point,
        mapping the updated candidate evaluation point from the tangent space to the parameter space, and
        using the mapped updated candidate evaluation point as candidate
    evaluation point for a next iteration until a stop criterion is fulfilled; and
    controlling the robot in accordance with a control parameter value found in the Bayesian optimization;
    wherein the parameter space is a Riemannian manifold and wherein the Bayesian optimization uses a Gaussian process as surrogate model having a kernel dependent on an induced metric of the Riemannian manifold;
    calculating kernel matrices for multiple randomly sampled pairs of points of the parameter space and setting a parameter of the kernel to a minimum value for which the kernel matrices are positive definite.

10. The method according to claim 9, further comprising:
    determining the search direction according to the conjugate gradient method.

11. A robot controller configured to control a robot using control parameter values from a non-Euclidean control parameter space, the robot controller configured to:
    perform a Bayesian optimization of an objective function representing a desired control objective of the robot over a control parameter space, wherein evaluation points of the objective function are determined by searching an optimum of an acquisition function in an iterative search, wherein the robot control is configured to, in each iteration:
        update a candidate evaluation point using a search direction in a tangent space of the parameter space at the candidate evaluation point,
        map the updated candidate evaluation point from the tangent space to the parameter space, and
        use the mapped updated candidate evaluation point as candidate evaluation point for a next iteration until a stop criterion is fulfilled;
    control the robot in accordance with a control parameter value found in the Bayesian optimization;
    determine the search direction according to the conjugate gradient method;
    determine a search direction for the mapped updated candidate evaluation point by modifying a gradient of the acquisition function at the mapped updated candidate evaluation point by a multiple of the search direction at the candidate evaluation point mapped to the tangent space of the parameter space at the mapped updated candidate evaluation point by parallel transport.

12. A non-transitory computer readable medium on which is stored instructions for controlling a robot using control parameter values from a non-Euclidean control parameter space, the instructions, when executed by a processor, causing the processor to perform the following steps:
    performing a Bayesian optimization of an objective function representing a desired control objective of the robot over a control parameter space, wherein evaluation points of the objective function are determined by searching an optimum of an acquisition function in an iterative search, including, in each iteration:
        updating a candidate evaluation point using a search direction in a tangent space of the parameter space at the candidate evaluation point,
        mapping the updated candidate evaluation point from the tangent space to the parameter space, and
        using the mapped updated candidate evaluation point as candidate evaluation point for a next iteration until a stop criterion is fulfilled;
    controlling the robot in accordance with a control parameter value found in the Bayesian optimization;
    determining the search direction according to the conjugate gradient method; and
    determining a search direction for the mapped updated candidate evaluation point by modifying a gradient of the acquisition function at the mapped updated candidate evaluation point by a multiple of the search direction at the candidate evaluation point mapped to the tangent space of the parameter space at the mapped updated candidate evaluation point by parallel transport.

* * * * *